United States Patent
Blasi

(10) Patent No.: US 10,382,425 B2
(45) Date of Patent: *Aug. 13, 2019

(54) TECHNOLOGIES FOR TOKEN-BASED AUTHENTICATION AND AUTHORIZATION OF DISTRIBUTED COMPUTING RESOURCES

(71) Applicant: Worldpay, LLC, Symmes Township, OH (US)

(72) Inventor: Scott Edward Blasi, Symmes Township, OH (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/010,869

(22) Filed: Jun. 18, 2018

(65) Prior Publication Data
US 2018/0309746 A1    Oct. 25, 2018

Related U.S. Application Data

(63) Continuation of application No. 15/162,936, filed on May 24, 2016, now Pat. No. 10,044,701.

(51) Int. Cl.
*H04L 29/06* (2006.01)
*H04L 9/32* (2006.01)
(Continued)

(52) U.S. Cl.
CPC ............ *H04L 63/0807* (2013.01); *G06F 9/54* (2013.01); *G06F 21/105* (2013.01); *G06F 21/33* (2013.01); *H04L 9/3213* (2013.01); *H04L 9/3239* (2013.01); *H04L 9/3247* (2013.01); *H04L 63/0442* (2013.01); *H04L 63/0815* (2013.01); *H04L 63/126* (2013.01)

(58) Field of Classification Search
None
See application file for complete search history.

(56) References Cited

U.S. PATENT DOCUMENTS 9,135,412 B1 * 9/2015 Talvensaari ............. G06F 21/10
9,288,208 B1 * 3/2016 Roth ................... H04L 63/0884
(Continued)

*Primary Examiner* — Gary S Gracia
(74) *Attorney, Agent, or Firm* — Bookoff McAndrews, PLLC

(57) ABSTRACT

Technologies for token-based access authorization to an application program interface (API) include an access management server to receive a service request message from an application executed by a remote computing device. The service request message includes a digitally signed license token previously generated by the access management server and distributed to the remote computing device. The service request message also includes a request from the executed application to access data or a service of the resource server via an exposed API. The access management server verifies the digital signature of the digitally signed license token and generates a digitally signed Security Assertion Markup Language (SAML) token. The digitally signed SAML token is transmitted to the resource server for verification and local caching. The resource server receives the service request message and determines whether access to the requested data or service is authorized based on the locally-cached SAML token.

20 Claims, 6 Drawing Sheets

(51) Int. Cl.
*G06F 21/10* (2013.01)
*G06F 9/54* (2006.01)
*G06F 21/33* (2013.01)

(56) References Cited

U.S. PATENT DOCUMENTS

| | | | | |
|---|---|---|---|---|
| 9,740,759 | B1* | 8/2017 | Zhang | H04L 67/1095 |
| 2004/0025022 | A1* | 2/2004 | Yach | G06F 21/121 |
| | | | | 713/176 |
| 2012/0179907 | A1* | 7/2012 | Byrd | H04L 9/3268 |
| | | | | 713/156 |
| 2013/0042115 | A1* | 2/2013 | Sweet | H04L 63/0428 |
| | | | | 713/176 |
| 2013/0145150 | A1* | 6/2013 | Yach | G06F 21/121 |
| | | | | 713/155 |
| 2013/0305394 | A1* | 11/2013 | Nozue | G06F 21/57 |
| | | | | 726/30 |
| 2014/0208096 | A1* | 7/2014 | Brandwine | H04L 9/3263 |
| | | | | 713/156 |
| 2015/0026049 | A1* | 1/2015 | Theurer | G06Q 20/36 |
| | | | | 705/41 |
| 2015/0121462 | A1* | 4/2015 | Courage | H04L 63/08 |
| | | | | 726/4 |
| 2015/0121517 | A1* | 4/2015 | Dimov | G06F 21/44 |
| | | | | 726/20 |
| 2016/0134599 | A1* | 5/2016 | Ross | H04L 63/08 |
| | | | | 713/168 |

* cited by examiner

| HEADER DATA 310 | PAYLOAD 320 | | | | | | | DIGITAL SIGNATURE 340 |
|---|---|---|---|---|---|---|---|---|
| | LICENSE ID 322 | EXTENDED ATTRIBUTES 324 <br> UNIQUE KEY 326 | EXPIRATION DATE 328 | SIGN / VERIFY KEY PAIR ID 330 | HASH ALGORITHM TYPE 332 | ENCRYPTION ALGORITHM TYPE 334 | TOKEN FORMAT VERSION 336 | |

FIG. 3

TECHNOLOGIES FOR TOKEN-BASED AUTHENTICATION AND AUTHORIZATION OF DISTRIBUTED COMPUTING RESOURCES

CROSS-REFERENCE TO RELATED APPLICATION(S)

This patent application claims the benefit under 35 U.S.C. § 119 to U.S. Nonprovisional patent application Ser. No. 15/162,936, filed on May 24, 2016, the entirety of which is incorporated herein by reference.

TECHNICAL FIELD

Embodiments of the technologies described herein relate, in general, to the field of authentication and authorization of computing devices and resources thereof. More particularly, the technologies relate to the field of using signed custom tokens as a root credential for authenticating and authorizing distributed computing devices and resources.

BACKGROUND

Independent Software Vendors (ISVs) develop applications and systems configured, to perform payment processing operations and/or provide other functionality in connection with services and data provided by an acquirer processor. One or more Application Program Interfaces (APIs) can be exposed by the acquirer processor to facilitate interactions between applications and systems developed by an ISV and devices and resources of the acquirer processor.

SUMMARY

In an embodiment, the present disclosure is directed, in part, to a method for token-based access authorization to an application program interface (API). The method includes receiving, by an access management server and from a remote computing device, a service request message requesting access to an API of a resource server. The service request message includes a digitally signed license token having an unencrypted payload portion and a digital signature appended thereto. The digital signature includes a previously-generated hash value of the unencrypted payload portion encrypted with a private key of a cryptographic key pair. The method further includes decrypting, by the access management server, the digital signature of the digitally signed license token with a corresponding public key of the cryptographic key pair to obtain the previously-generated hash value of the unencrypted payload portion of the digitally signed license token. Additionally, the method includes generating, by the access management server, a new hash value of the unencrypted portion of the digitally signed license token. The method also includes determining, by the access management server, whether the new hash value of the unencrypted portion of the digitally signed license token matches the previously-generated hash value of the unencrypted portion of the digitally signed license token. The method further includes generating, by the access management server, a digitally signed Security Assertion Markup Language (SAML) token in response to a determination that the new hash value matches the previously-generated hash value. The digitally signed SAML token includes one or more entitlements defining access rights of the remote computing device. Also, the method includes transmitting, by the access management server, the digitally signed SAML token to the resource server for local caching. The method further includes forwarding, by the access management server, the service request message to the resource server for authorizing the remote computing device to access the API as a function of the locally-cached digitally signed SAML token.

In another embodiment, the present disclosure is directed, in part, to an access management server for token-based access authorization to an application program interface (API). The access management server includes logic stored in memory, which when executed by a processor of the access management server, causes the access management server to receive, from a remote computing device, a service request message requesting access to an API of a resource server. The service request message includes a digitally signed license token having an unencrypted payload portion and a digital signature appended thereto. The digital signature includes it previously-generated hash value of the unencrypted payload portion encrypted with a private key of a cryptographic key pair. The logic further causes the access management server to decrypt the digital signature of the digitally signed license token with a corresponding public key of the cryptographic key pair to obtain the previously-generated hash value of the unencrypted payload portion of the digitally signed license token. Additionally, the logic causes the access management, server to generate a new hash value of the unencrypted portion of the digitally signed license token. The logic also causes the access management server to determine whether the new hash value of the unencrypted portion of the digitally signed license token matches the previously-generated hash value of the unencrypted portion of the digitally signed license token. The logic further causes the access management server to generate a digitally signed Security Assertion Markup Language (SAML) token in response to a determination that the new hash value matches the previously-generated hash value. The digitally signed SAML token includes one or more entitlements defining access rights of the remote computing device. Also, the logic causes the access management server to transmit the digitally signed SAML token to the resource server for local caching. The logic further causes, the access management server to forward the service request message to the resource server for authorizing the remote computing device to access the API as a function of the locally-cached digitally signed SAML token.

In another embodiment, the present disclosure is directed, in part, to a system for token-based authentication and access authorization to an application program interface (API). The system includes a remote computing device, an access management server, and a resource server. The access management server is configured to receive, from a remote computing device, a service request message requesting access to an API of a resource server. The service request, message includes a digitally signed license token having an unencrypted payload portion and a first digital signature appended thereto. The first digital signature comprises a previously-generated hash value of the unencrypted payload portion encrypted with a private key or a cryptographic key pair. The access management server is further configured to decrypt the first digital signature of the digitally signed license token with a corresponding public key of the cryptographic key pair to obtain the previously-generated hash value of the unencrypted payload portion of the digitally signed license token. Additionally, the access management server is configured to generate a new hash value of the unencrypted portion of the digitally signed license token. The access management server is also configured to determine whether the new hash value of the unencrypted portion of the digitally signed license token matches the previously-generated hash value of the unencrypted portion of the digitally signed license token. The access management server is further configured to generate a digitally signed Security Assertion Markup Language (SAML) token in response to a determination that the new hash value matches the previously-generated hash value. The digitally signed SAML token includes one or more entitlements defining access rights of the remote computing device and a second digital signature appended thereto. Additionally, the access management server is configured to transmit the digitally signed SAML token to the resource server and forward the service request message to the resource server.

The resource server of the system of such embodiment is configured to receive the digitally signed SAML token from the access management server and verify the second digital signature appended to the digitally signed SAML token. Additionally, the resource server is configured to locally cache the digitally signed SAML token and associated entitlements in response to verifying the second digital signature and receive the service request forwarded by the access management server. The resource server is also configured to determine, as a function of the locally-cached digitally signed SAML token and associated entitlements, whether the access to the API requested by the remote computing device is authorized. Additionally, the resource server is configured to grant access to the remote computing device to access the API in response to a determination that access to the API is authorized.

BRIEF DESCRIPTION OF THE DRAWINGS

It is believed that certain embodiments will be better understood from the following description taken in conjunction with the accompanying drawings, in which like references indicate similar elements and in which:

FIG. 3 schematically shows an embodiment of an exemplary format of a signed custom token that can be generated and provisioned by the access management server of FIG. 1;

DETAILED DESCRIPTION

Various non-limiting embodiments of the present disclosure will now be described to proved an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment can be combined with the features of other non-limiting embodiments. Such modifications and variations are intended to be included within the scope of the present invention.

Figure 1:
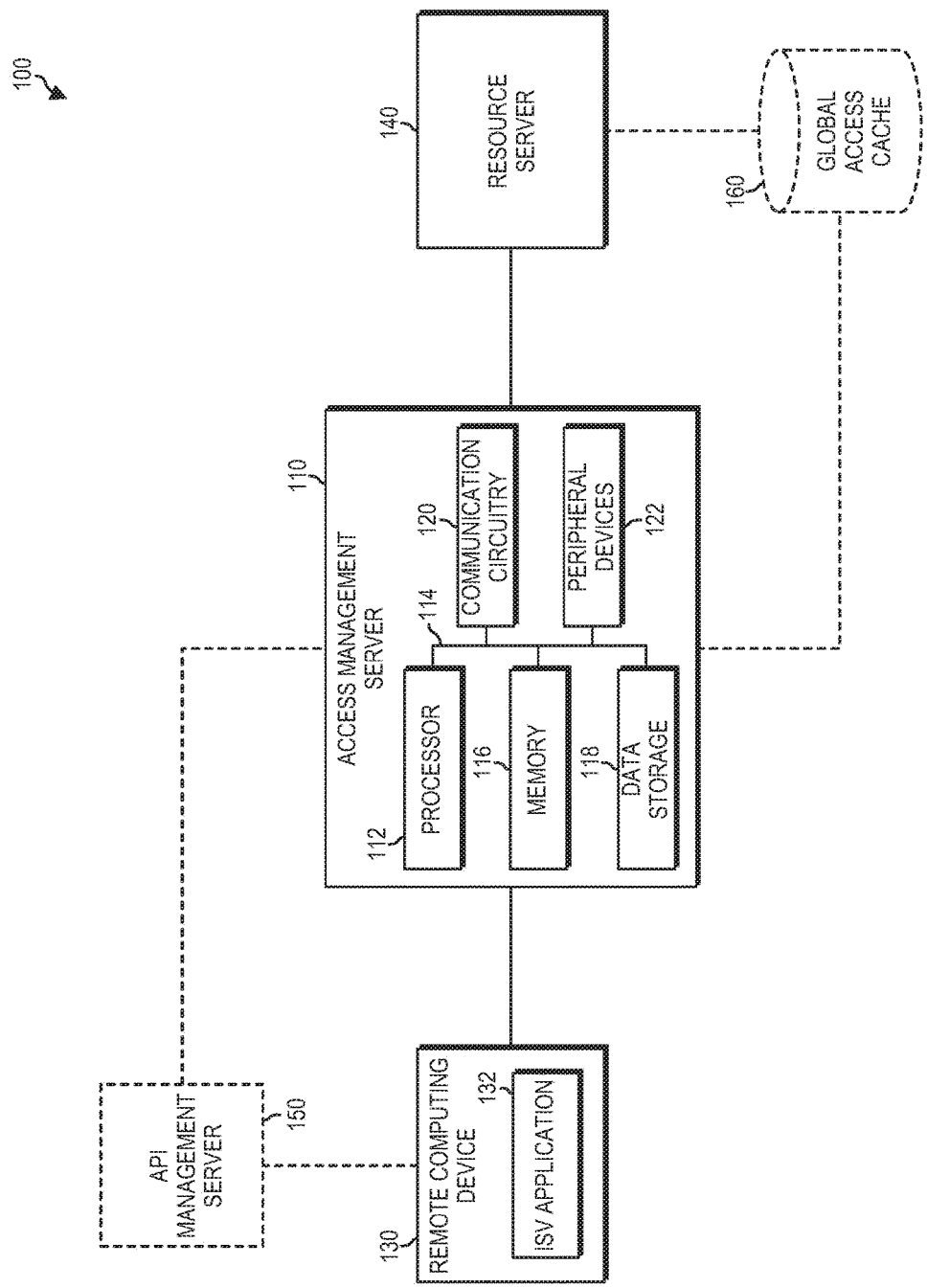
FIG. 1 is a simplified block diagram of at least one embodiment of a system for provisioning and using a signed custom token for authenticating distributed computing resources and authorizing access to a resource server.

Referring now to FIG. 1, in one embodiment, a system 100 for provisioning and using a signed custom token for authentication and authorization of distributed computing resources includes an access management server 110 in communication with a remote computing device 130 and a resource server 140 via one or more communication network (s). It should be appreciated that although the system 100 includes a single remote computing device 130 and a single resource server 140 in the illustrative embodiment, the system 100 can include any number of remote computing devices 130 and resource servers 140, in other embodiments.

The remote computing device 130 can be embodied as a computing device, platform, or service (e.g., "a requesting entity") of an Independent Software Vendor (ISV) configured to interact with data or a service provided by the resource server 140. In some embodiments the resource server 140 can be associated with an acquirer processor (or another type of entity), which can be configured to process payment vehicle transactions for merchants. In such embodiments, the ISV can facilitate interactions with the resource server 140 of the acquirer processor. For example, in some embodiments, the remote computing device 130 can include an ISV application 132 configured to perform payment processing operations and/or provide other functionality in connection with services and/or data provided by the resource server 140 of the acquirer processor. In operation, the ISV application 132 is configured to interact with the services and/or data provided by the resource server 140 via one or more exposed Application Program Interfaces (APIs). For example, in some embodiments, the ISV application 132 is configured to initiate one or more calls to the APIs exposed by the resource server 140. Prior to being granted access to the resource server 140, or the services and/or data provided by the resource server 140, the ISV application 132 can be required to be authenticated and authorized by the access management server 110, the resource server 140, or another computing device of the system 100.

In some embodiments, to facilitate authentication and authorization of the ISV application 132 or, more generally, the remote computing device 130, a digitally signed license token is generated by the access management server 110 and provisioned to the ISV for use in connection with the ISV application 132 and/or the remote computing device 130. In the illustrative embodiment, the digitally signed license token generated and provisioned by the access management server 110 has a custom or proprietary token format configured to be used by the ISV application 132 and/or the remote computing device 130 as a root, primary, or shared secret credential for system-to-system authentication. In doing so, traditional types of authentication credentials (e.g., usernames, passwords, client-side certificate, OAuth tokens, etc.) may be unnecessary for authentication and interactions between computing devices (or applications executing thereon).

As discussed in more detail below (see e.g., FIG. 3), the payload of the digitally signed license token generated by the access management server 110 includes license identification data that uniquely identifies the license token, a unique key (e.g., an API key, a unique identifier, etc.) corresponding to the ISV or the ISV application 132, an expiration date of the license token, a signature verification key pair identifier that identifies a public/private key pair used to sign the license token, a hash algorithm type indicative of the hash algorithm used, an encryption algorithm type indicative of the encryption algorithm used, and a token format version indicative of the version of the custom license token format. It should be appreciated that the payload of the digitally signed license token can also include different or additional types of data. Additionally, in the illustrative embodiment, the payload (including the data embedded therein) of the digitally signed license token is unencrypted (e.g., cleartext, etc.). After generating the digitally signed license token, the access management server 110 transmits the digitally signed license token to the remote computing device 130 for integration within the ISV application 132 or another application, service, and/or computing device of the ISV. In some embodiments, the digitally signed license token generated by the access management server 110 is transmitted out-of-band (e.g., during a separate communication session or via a separate communications channel) to the remote computing device 130.

As disclosed, an application developed and provided by an ISV for another entity) can be configured to utilize one or more services or data provided by computing devices of an acquirer processor for another entity). For example, the ISV application 132 can be configured to execute on the remote corn puling device 130 and interact with a resource server 140 configured to provide such services and/or data. To facilitate access to the provided services and data, the resource server 140, or an intermediary computing device such as the API management sever 50, is configured to expose one or more APIs (not shown). As such, the ISV application 132 can be configured to initiate one or snore APS calls to the exposed APIs when executed by the remote computing device 130. The API cads can be transmitted 10 the resource server 140; or to an intermediary device (e.g., the access management server 110, the API management server 150, etc.), via one or more web services and protocols (e.g., HTTP, HTTPS, JSON, XML, REST, SOAP, etc.). In embodiments wherein the API calls are transmitted via HTTP messages, or messages having similar protocols, message level encryption can be employed to implement a secure system. In the illustrative embodiment, the digitally signed license token can be embedded within the ISV application 132. As such, the API calls transmitted to the resource server 140 (or to an intermediary device) are configured to include, or otherwise embed within, the digitally signed license token.

In some embodiments, the access management server 110 receives a service request message prior to delivery or the service request message to the resource server 140. The service request message can include a request by the ISV application 132 to access data or services provided by the resource server 140 via one or more exposed APIs. In the illustrative embodiment, the service request message includes a digitally signed license token. The digitally signed license token includes an unencrypted payload portion and an appended digital signature. The unencrypted payload portion includes, among other types of data and fields, a unique key (e.g., a license key, an API key, etc.) associated with the ISV application 132 or, more generally, the ISV providing the ISV application 132. The digital signature appended to the license token can be embodied as an encrypted hash value generated from the data and fields of the unencrypted payload portion of the digitally signed license token.

The access management server 110 can authenticate the ISV application 132 and/or the requesting entity (e.g., the ISV) based on the digitally signed license token included with the service request message. To do so, the access management server decrypts the digital signature appended to the license token using a public key that corresponds to the private key initially used to encrypt the hash value of the unencrypted payload portion of the license token. It should be appreciated that by decrypting the digital signature of the license token, the access management server 110 obtains a previously-generated hash value of the unencrypted payload portion of the digitally signed license token. Subsequently, the access management server 110 generates a new hash of the unencrypted payload portion of the digitally signed license token. Thereafter, the access management server 110 compares the newly-generated has value of the unencrypted portion of the digitally signed license token to the previously-generated has value obtained through decrypting the digital signature appended to the license token. If the newly-generated has value matches the previously-generated hash value, the access management server 110 determines that the license token has not been modified. If, however, the access management server 110 determines that the license token has been modified, the access management server 110 takes preventative measures. For example, the access management server 110 can discard the service request message, generate and distribute one or more firewall rules configured to cause a receiving computing device to drop or block further communications (e.g., service request messages, API calls, etc.), and/or log or quarantine the service request message and/or the tampered with digitally signed license token for subsequent forensic investigation. In some embodiments, as a function of determining that the digitally signed license token has not been modified, the access management server 110 generates a signed Security Assertion Markup Language (SAML) token for authorizing the ISV application 132 (or other application or service) to access the exposed APIs of the resource server 140. The signed SAML token generated by the access management server 110 includes one or more entitlements that define the access rights and permissions of the ISV application 132 with respect to the resource server 140 and/or other computing devices of the system 100. The access management server 110 transmits the signed SAML token to the resource server 140 to be verified and locally cached. Additionally or alternatively, the access management server 110 transmits the signed SAML token to the global access cache 160, which as described in more detail below, can be configured to verify and globally cache the signed SAML token and the entitlements included therein for subsequent use by the resource server 140 or multiple resource servers 140. After transmitting the signal SAML token to the resource server 140 and/or the global access cache 160, the access management server 110 forwards the service request message to the resource server 140 for access authorization and provision of the requested services and/or data.

In the illustrative embodiment, the resource server 140 is configured to verify the signed SAML token provided by the access management server 110. To do so, the resource server 140 decrypts the digital signature of the signed SAML token to obtain a previously-generated hash value of the SAML token. The resource server 140 then generates a new hash value of the SAML token and compares the newly-generated hash value to the previously-generated hash value to determine whether they match. If the newly-generated hash value matches the previously-generated hash value, the resource server 140 determines that the SAML token has not been modified. As a function of that determination, the resource server 140 locally caches the SAML token and the entitlements included therein for later authorization of the ISV application 132. In some embodiments, the SAML token is locally cached in association with the license identification data (e.g., license identifier) embedded within the unencrypted payload portion of the license token. As discussed in more detail below, the associated license identification data can be used to determine whether a corresponding locally cached SAML token exists or whether one needs to be generated.

As discussed, the access management server 110 forwards the service request message from the ISV application 132 to the resource server 140. Upon receipt, the resource server 140 determines whether a SAML token corresponding to the ISV application 132 or, more generally, the ISV, is locally cached. In some embodiments, resource server 140 uses the license identifier embedded within the unencrypted payload portion of the license token to determine whether a SAML token corresponding to the ISV application 132 is locally cached. In response to making such a determination and based on the entitlements associated with the corresponding SAML token, the resource server 140 determines whether the ISV application 132 should be authorized to access the services and/or data provided by the resource server 140 via the one or more exposed APIs. If it is determined that the ISV application 132 should be authorized to access the requested services and/or data, the resource server 140 grants the ISV application 132 access to the requested services and/or data.

The access management server 110 can be embodied as a computing device or server capable of processing, communicating, storing, maintaining, and transferring data. For examples, the access management server 110 can be embodied as a server, a mainframe, a desktop computer, a laptop computer, a mobile computing device, a custom chip, an embedded processing device, or other computing device and/or suitable programming device. In some embodiments, the access management server 110 can be embodied as a computing device integrated with other systems or subsystems. In the illustrative embodiment of FIG. 1, the access management server 110 includes a processor 112, a system bus 114, a memory 116, a data storage 118, communication circuitry 120, and one or more peripheral devices 122. Of course, the access management server 110 can include other or additional components, such as those commonly found in a server and/or computer (e.g., various input/output devices), in other embodiments. Additionally, in some embodiments, on ore more of the illustrative components can be incorporated in, or otherwise from a portion of, another component. For example, the memory 116, or portions thereof, can be incorporated in the processor 112 in some embodiments. Furthermore, it should be appreciated that the access management server 110 can include other components, sub-components, and devices commonly found in a computer and/or computing device, which are not illustrated in FIG. 1 for clarity of the description.

The processor 112 can be embodied as any type of processor capable of performing the functions described herein. For example, the processor 112 can be embodied as a single or multi-core processor, a digital signal processor, microcontroller, a general purpose central processing unit (CPU), a reduced instruction set computer (RSIC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

In various configurations, the access management server 110 includes a system bus 114 for interconnecting the various components of the access management server 110. The system bus 114 can be embodied as, or otherwise include, memory controller hubs, input/output control hubs, firmware devices, communication links (e.g., point-to-point links, bus links, wires, cables, light guides, printed circuit board traces, etc.) and/or other components and subsystems to facilitate the input/output operations with the processor 112, the memory 116, and other components of the access management server 110. In some embodiments, the access management server 110 can be integrated into one or more chips such as programmable logic device or an application specific integrated circuit (ASIC). In such embodiments, the system bus 114 can form a portion of a system-on-a-chip (SoC) and be incorporated, along with the processor 112, the memory 116, and other components of the access management server 110, on a single integrated circuit chip.

The memory 116 can be embodied as any type of volatile or non-volatile memory or data storage capable of performing the functions described herein. For example, the memory 116 can be embodied as read only memory (ROM), random access memory (RAM), cache memory associated with the processor 112, or other memories such as dynamic RAM (DRAM), static RAM (SRAM), programmable ROM (PROM), electrically erasable PROM (EEPROM), flash memory, a removable memory card or disk, a solid state drive, and so forth. In operation, the memory 116 can store various data and software used during operation of the access management server 110 such as operating systems, applications, programs, libraries, and drivers.

The data storage 118 cars be embodied as any type of device or devices configured for short-term or long-term storage of data such as, for example, memory devices and circuits, memory cards, hard disk drives, solid-state drives, or other data storage devices. For example, in some embodiments, the data storage 118 includes storage media such as a storage device that can be configured to have multiple modules, such as magnetic disk drives, floppy drives, tape drives, hard drives, optical driven and media, magneto-optical drives and media, Compact Disc (CD) drives, Compact Disc Read Only Memory (CD-ROM). Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID) virtual drives, networked drives and other memory means including storage media on the processor 112, or the memory 116 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

The communication circuitry 120 of the access management server 110 can be embodied as any type of communication circuit, device, interface, or collection thereof, capable of enabling communications between the access management server 110 and the remote computing device 130, the resource server 140, the API management server 150, the global access cache 160, and/or any other computing device communicatively coupled hereto. For example, the communication circuitry 120 can be embodied as one or more network interface controllers (NICs), in some embodiments. The communication circuitry 120 can be configured to use any one or more communication technologies (e.g., wireless or wired communications) and associated protocols (e.g., Ethernet, Wi-Fi®, WiMAX, etc.) to effect such communication.

In some embodiments, the access management server 110, the remote computing device 130, the resource server 140, the API management sever 150, the global access cache 160, and/or any other computing devices of the access management server 110, can communicate with each other over one or more networks (not shown). The network(s) can be embodied as any number of various wired and/or wireless communications networks. For example, the network(s) can be embodied as or otherwise include a local area network (LAN), a wide area network (WAN), a cellular network, or a publicly-accessible, global network such as the Internet. Additionally, the network(s) can include any number of additional devices to facilitate communications between the computing devices of system 100.

Additionally, in some embodiments, the access management server 110 can further include one or more peripheral devices 122. Such peripheral devices 122 can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

The remote computing device 130 can be embodied as any type of computing device capable of performing the functions described herein. As such, the remote computing device 130 can include devices and structures commonly found in computing devices such as processors, memory devices, communication circuitry, and data storages, which are not shown in FIG. 1 for clarity of the description. In the illustrative embodiment, the remote computing device 130 executes the ISV application 132. The ISV application 132 is configured to utilize one or more services and/or data provided by the resource server 140 through exposed APIs. To do so, the ISV application 132 generates one or more API calls to the exposed APIs. As discussed herein, the API calls generated by the ISV application 132 include the digitally signed license token to facilitate authentication and authorization of the ISV application 132 and/or the remote computing device 130. In the illustrative embodiment, the digitally signed license token is generated and provided to the remote computing device 130 and/or the ISV (or other entity) in advance of generating the API calls to the exposed APIs. In doing so, the ISV application 132 does not have to incorporate complex cryptographic routines and programming.

The resource server 140 can be embodied as any type of computing device capable of performing the functions described herein. As such, the remote resource server 140 can include devices and structures commonly found in computing devices such as processors, memory devices, communication circuitry, and data storages, which are not shown in FIG. 1 for clarity of the description. As discussed herein, the resource server 140 can be operated, managed, or otherwise associated with an acquirer processor (or some other entity). The resource server 140 is configured to provide services and/or data to the remote computing device 130 and/or ISV application 132 via one or more exposed APIs. Prior to providing such services and data, the remote computing device 130 and/or the ISV application 132 can be required to be authenticated and authorized by the access management server 110 and/or the resource server 140.

The API management server 130 can be embodied as any type of computing device capable of performing the functions described herein. As such, the API management server 150 can include devices and structures commonly found in computing devices such as processors, memory devices, communication circuitry, and data storages, which are not shown in FIG. 1 for clarity of the description. As discussed herein, the API management server 150 is configured to manage (e.g., route, direct, load-balance, etc.) API calls from the ISV application 132 to the resource server 140. In that way, the API management server 150 can be an intermediary device between the remote computing device 130 and the access management server 110 and/or the resource server 140. In some embodiments, the API management server 150 is configured to generate the unique key (e.g., license key, API key, etc.) that corresponds to the ISV or the ISV application 132. In such embodiments, the unique key can be embedded within the unencrypted payload of the digitally signed license token generated by the access management server 110. It should be appreciated, however, that the unique key embedded within the unencrypted payload of the digitally signed license token can be generated by a computing device other than the API management server 150. Additionally, in some embodiments, the API management server 150 is configured to perform one or more initial security functions on API calls originating from the ISV application 132. It should be appreciated that in such embodiments, the initial security functions performed on the API calls by the API management server 150 can be separate and distinct from the authentication and authorization functions performed by the access management server 110 and/or the resource server 140, as described herein.

The global access cache 160 can be embodied as any type of computing device capable of performing the functions described herein. As such, the global access cache 160 can include devices and structures commonly found in computing devices such as processors, memory devices, communication circuitry, and data storages, which are not shown in FIG. 1 for clarity of the description. As discussed herein, the global access cache 160 can be configured to store, cache, and/or manage one or more SAML tokens received from the access management server 110 in connection with an access request from the ISV application 132. In some embodiments, one or more entitlements can be stored in association with each of the SAML tokens managed by the global access cache 160. The entitlements granularly define the access rights of the ISV application 132 or, more generally, the corresponding ISV (or other entity) with respect to the resource server 140 and/or the services and data provided thereby. As such, the entitlements for a particular SAML token can be embodied as an access control list (ACL) that defines one or more permissions and/or access right of the ISV application 132 and/or the ISV. In some embodiments, each of the SAML tokens managed by global cache 160 can include an associated license identifier that can be used for indexing and SAML token existence verification. In embodiments in which the system 100 includes the global access cache 160, the resource server 140 (or multiple resource servers 140) can be configured to communicate with the global access cache 160 to determine, based on the cached SAML tokens, whether the ISV application 132 should be authorized (and thereby granted access) to the requested resources and/or services.

In some embodiments, the access management server 110, the remote computing device 130, the resource server 140, the API management server 150, and the global access cache 160, can each establish an environment during operation. Each environment can include various modules, components, sub-components, and devices commonly found in computing devices, which are not illustrated in the figures for clarity of the description. The various modules, components, sub-components, and devices of each environment can be embodied as hardware, firmware, software, or a combination thereof. For example, one or more of the modules, components, sub-components, and devices of each environment can be embodied as a processor and/or a controller configured to provide the functionality described herein.

Figure 2:
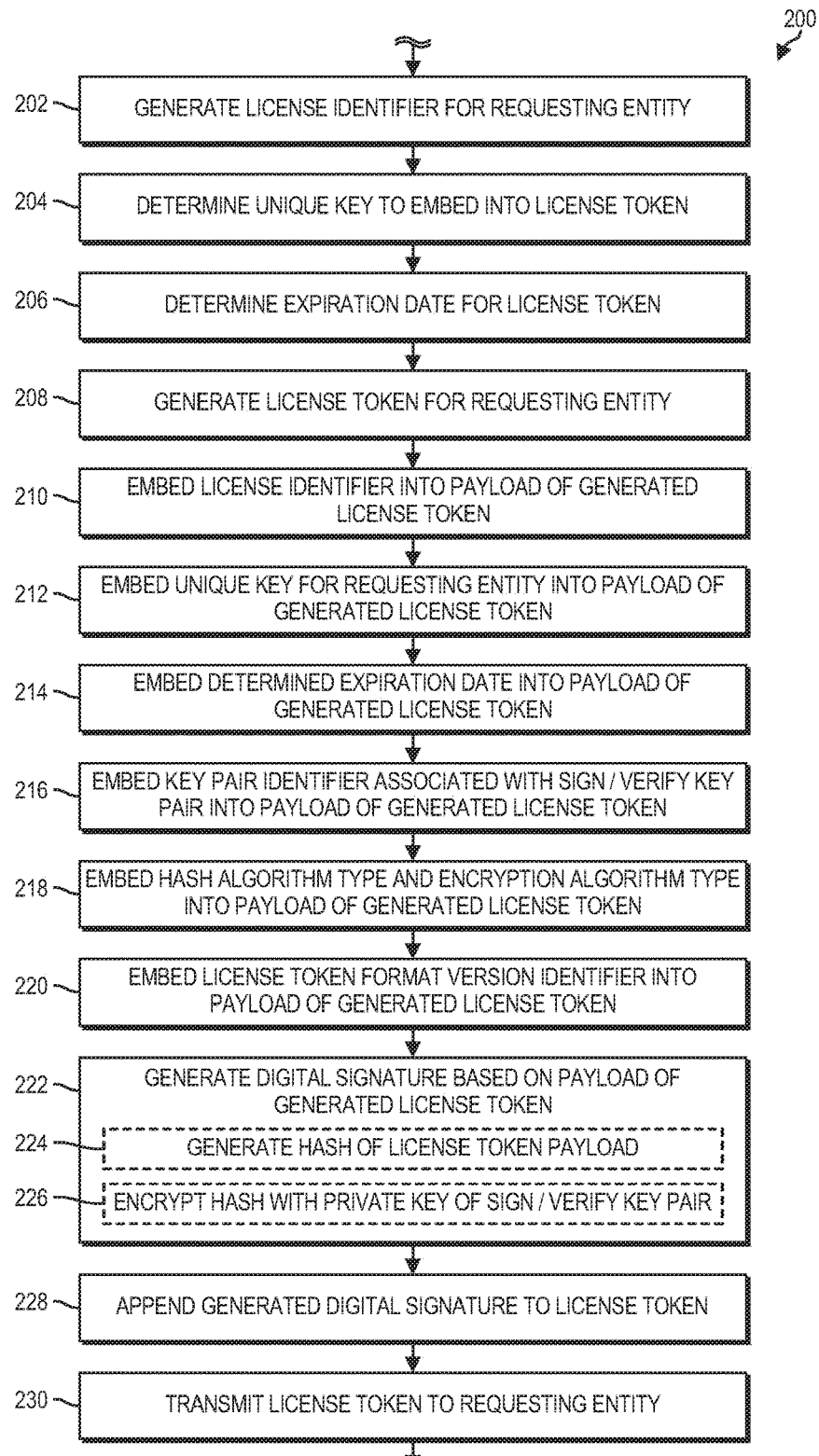
FIG. 2 is simplified flow diagram of at least one embodiment of a method that may be executed by the access management server of FIG. 1 for generating and provisioning a signed custom token.

Referring now to FIGS. 1-3, the access management server 110 can execute a method 200 shown in FIG. 2 for generating a digitally signed license token such as the digitally signed license token 300 illustratively shown in FIG. 3. The method 200 begins with block 202 in which the access management server 110 generates a license identifier 322 for the license token 300 that is to generated for the requesting entity. As discussed, the digitally signed license token 300 can be generated for authentication and authorization of an application (e.g., the ISV application 132), a product, a service, or a computing device (e.g., the remote computing device 130) associated with an entity (e.g., and ISV or another type of entity) requesting access to data or a service provided by a resource server 140 via one or more exposed APIs. As such, the license identifier 322 generated by the access management server 110 can be configured to uniquely identify the digitally signed license token 300 that is to be generated for use by the requesting entity and associated computing devices and applications. For example, in some embodiments, the license identifier 322 can be a globally unique identifier (GUID) including one or more hexadecimal digits.

In block 204, the access management server 110 determines a unique key 326 (e.g., a license key, an API key, etc.) to embed within the digitally signed license token 300 that is to be generated for the requesting entity (e.g., the ISV and/or the ISV application 132. The unique key 320 can be embodied as a string of characters and can be unique to the requesting entity. In some embodiments, the unique key 326 is previously generated by the API management server 150 and is used to perform one or more initial security checks. In other embodiments, the unique key is previously-generated by the access management server 110 or another computing device of the system 100. In such an embodiment, the unique key 326 can be the output of one or more cryptographic algorithms (e.g., hash algorithms, encryption algorithms, etc.) or random number generation algorithms executed by the API management server 150, the access management server 110, or any other computing device of the system 100.

In block 206, the access management server 110 can determine an expiration date 328 for the license token that is to be generated. For example, the access management server 110 can calculate a date one year (or any other reference duration) from the current date to use as the expiration date 328. It should be appreciated that the access management server 110 can use any other suitable process for determining an expiration date 328 for the license token 300. In some embodiments, the expiration date 328 can be used by the access management server 110 and other computing devices of the system 110 to determine whether the digitally signed license token 300 is still valid or if it has expired.

In block 208, the access management server 110 generates the license token 300 for the requesting entity (e.g., the ISV or the ISV application 132). The license token 300 includes header data 310 and a payload 320. The header data 310 includes data and fields that define the structure of the license token 300, processing requirements of the license token 300, and/or any other type of data describing a characteristic of the license token 300. It should be appreciated that, in some embodiments, the license token 300 does not contain header data 310. The payload 320 includes various data and fields provided by the access management server 110 to facilitate the later authentication and authorization of the ISV application 132 or other service or device of the ISV. The data and/or fields included within the payload 320 portion of the license token 300 can be stored in cleartext. That is, in some embodiments, the payload portion 320 of the license token 300, and the data embedded or stored therein, is not encrypted or scrambled. As illustratively shown in FIG. 3, the payload 320 of the license token includes the license identifier 322, the unique key 326, the expiration date, a sign/verify key pair identifier 320, a hash algorithm type 322, an encryption algorithm type 334, and a token format version 336. It should be appreciated that in other embodiments, the payload 320 of the license token 300 can include additional or different types of data and fields.

Referring back to FIG. 2, in block 210, the access management server 110 embeds the license identifier 322 in the payload 320 of the license token 300. Subsequently, in block 212, the access management server 110 embeds the unique key 326 for the requesting entity into the payload 320 of the license token 300. In some embodiments, the unique key 326 can be embedded within an extended attribute portion 324 of the payload 320 of the license token 300. In block 214, the access management server 110 embeds the determined expiration date 328 into the payload 320. Subsequently, in block 216, the access management server 110 embeds the sign/verify key pair identifier 330 in the payload 320 of the license token 300. The sign/verify key pair identifier 330 identifies a public/private key pair that will be used to digitally sign the license token 300.

In block 218, the access management server 110 embeds the hash algorithm type 332 and the encryption algorithm type 334 into the payload 320 of the license token 300. The hash algorithm type 332 identifies the type of hash algorithm (e.g., SHA-256, SHA-512, etc.) that will be used when digitally signing the license token 300. The encryption algorithm type 334 identifies the type of encryption algorithm (e.g., RSA, AES, etc.) that will be used when digitally signing the license token 300. Subsequently, in block 220 the access management server 110 embeds the license token format version 330 into the payload 320 of the license token 300. The license token formal version 330 identifies the major version (e.g., a numeric character etc.) of the token or credential used.

In block 222, the access management server 110 generates a digital signature 340 for the license token 300 based at least in part on, or otherwise as a function of, the data and fields embedded within the payload 320 of the license token 300. To do so, in some embodiments, the access management server 110, in block 224, generates a hash of the unencrypted (e.g., cleartext) data and fields embedded within the payload 320 of the license token. In the illustrative embodiment, the access management server 110 utilizes a SHA-256 or a SHA-512 hashing algorithm to generate the hash of the unencrypted payload 320. Additionally, in block 226, the access management server 110 encrypts the hash of the pay load 320 with an RSA or an AES encryption algorithm (e.g., an RSA private key, an AES shared secret, etc.) to generate the digital signature 340. It should be appreciated that the access management server 110 can use any other type of hashing algorithm and/or encryption algorithm to generate the digital signature 340.

In block 22, the access management server 110 appends the generated digital signature 340 to the end of the license token to form the digitally signed license token 300. Subsequently, in block 230, the access management server 110 transmits or otherwise provides the digitally signed license token 300 to the requesting entity (e.g., the ISV, the ISV application 132, or another entity). As discussed, the digitally signed license token 300 can be used by an ISV application 132, or some other application or service of the requesting entity, as a root or primary credential for system-to-system authentication. In some embodiments, the access management server 110 securely transmits the digitally signed license token to the requesting entity out-of-band (e.g., during a separate communications session, via a separate communications channel, etc.)

Figure 4:
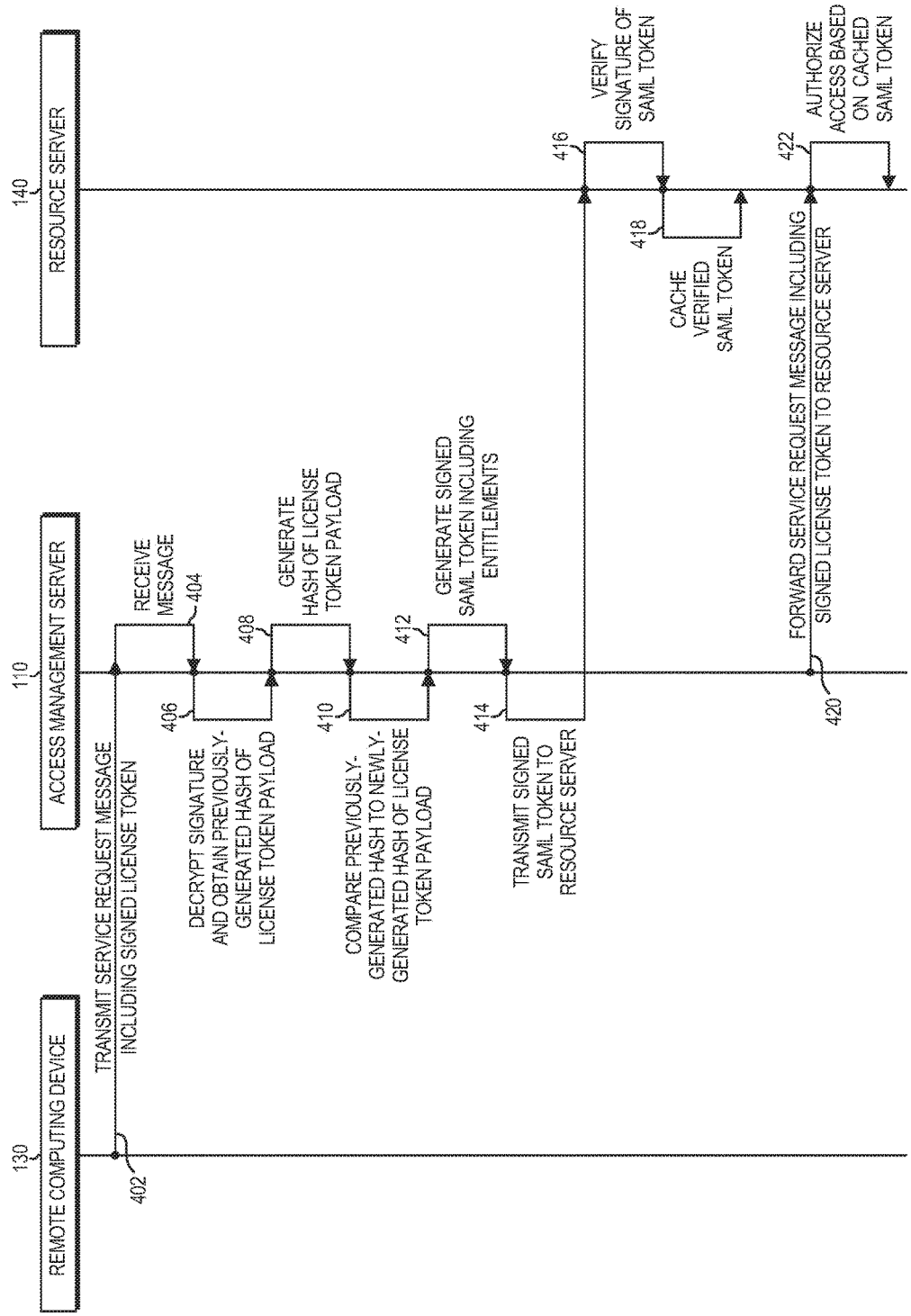
FIG. 4 is a simplified messaging and processing flow diagram of at least one embodiment of the system of FIG. 1 for using a signed custom token for authenticating a distributed computing resource and authorizing access to a resource server.

Referring now to FIG. 4, a simplified messaging and processing flow diagram of the system 100 using a digitally signed license token 300 for authenticating a distributed computing resource (e.g., the ISA application 132) of a requesting entity (e.g., an ISV or another entity) and authorizing access to a resource server 140 is depicted. At flow 402, the remote computing device 130 transmits a service request message including a digitally signed license token 300 to the access management server 110. In the illustrative embodiment, the intended recipient of the service request message is the resource server 140. It should be appreciated that in other embodiments, the service request message can be first transmitted to an intermediary computing device such as, for example, the API management server 150 (FIG. 1). In such embodiments, preprocessing and/or one or more initial security functions can be performed on the service request message by the intermediary computing device. Once complete, the service request message can be forwarded by the intermediary computing device to the access management server 110, the resource server 110, or another computing device of the system 100.

The service request message can include a request to access data or services provided by the resource server 140 via one or more exposed APIs. In some embodiments, the service request message is embodied as, or otherwise includes, and API call from the ISV application 132 to the exposed APIs. Additionally, the digitally signed license token 300 (FIG. 3) can be previously-generated by the access management server 110 and provided to the requesting entity for embedding within the ISV application 132. As described herein, the digitally signed license token 300 can include the unencrypted payload portion 320 and the digital signature 340. The unencrypted payload portion 320 can include, among other types of data and fields, a unique key (e.g., a license key, an API key, etc.) associated with the requesting entity. The digital signature 340 can be embodied as a hash value generated from the unencrypted payload portion 320 of the license token 300 and encrypted with an encryption algorithm. For example, as discussed herein, when generating the digitally signed license token 300, the access management server 110 can apply a hashtag algorithm (e.g., SHA-256, SHA-512, etc.) to the unencrypted payload portion 320 of the license token 300 to generate a hash value. Thereafter, the access management server 110 can encrypt the generated hash value with a private key of a sign/verify key pair (e.g., an RSA key pair) to generate the digital signature 340 appended to the end of the license token forming the digitally signed license token 300.

At flow 404, the access management server 110 receives the service request message prior to delivery of the message to the resource server 140. In embodiments in which the service request message is first transmitted to an intermediary computing device, the access management server 110 can receive the service request message after being forwarded by the intermediary computing device. At flow 406, the access management server 110 decrypts the digital signature 340 appended to the end of the digitally signed license token 300. To do so, in some embodiments, the access management server 110 can identify the public key of the public/private key pair needed to decrypt the digital signature 340 based on the sign/verify key pair identifier 330 embedded in cleartext within she unencrypted payload portion 320 of the digitally signed license token 300. In such embodiments, the access management server 110 retrieves the appropriate public key and decrypts the digital signature 340. By decrypting the digital signature 340, the access management server 110 obtains the previously-generated hash value of the unencrypted payload portion 320 of the digitally signed license token 300.

At flow 408, the access management server 110 generates a new bash value of the unencrypted payload portion 320 of the digitally signed license token 300. To do so, the access management server 110 can apply a hashing algorithm (e.g., SHA-256, SHA-512, etc.) to the unencrypted payload portion 320 of the received digitally signed license token 300 to generate the new hash value. At flow 410, the access management server 110 compares the previously-generated hash value obtained by decrypting the digital signature 340 with the new hash value generated from the unencrypted payload portion 320 of the received license token 300. If the newly-generated hash value matches the previously-generated hash value, then the payload portion 330 of the digitally signed license token 300 was not modified prior to being received (or intercepted) by the access management server 110. In that way, the access management server 110 can verify the integrity or authenticity of the license token 330 provided by the requesting entity (e.g., the ISV application 132). In some embodiments, if the access management server 110 determines that the payload portion 320 of the digitally signed license token has been modified, the access management server 110 can be configured to take one or more preventative measures. For example, the access management server 110 can be configured discard the service request message, generate and distribute one or more firewall rules configured to cause a receiving computing device to drop or block further communications (e.g., service request messages, API calls, etc.), and/or log or quarantine the service request message and/or the tampered with digitally signed license token 300 for subsequent forensic investigation.

Additionally, in some embodiments, the access management server 110 performs a revocation check on the digitally signed license token 300 or any component thereof (e.g., the unique key 326, the license identifier 322, etc.). The revocation check can determine whether the digitally signed license token 300, or any component thereof, is no longer valid. In some embodiments, the revocation check can be based on the license identifier 322 embedded within the unencrypted payload portion 320 of the received digitally signed license token 300. In other embodiments, the revocation check can be based on the unique key 326 or the expiration date 328 embedded within the unencrypted payload portion 320 of the received digitally signed license token 300. Any other data embedded within the digitally signed license token 300 and/or associated with the requesting entity can be used by the access management server 110 to perform the revocation check.

At flow 412, in response to determining that the newly-generated hash value of the unencrypted payload portion 320 of the received digitally signed license token 300 matches the previously-generated hash value of the unencrypted payload portion 320 obtained via decryption of the digital signature 340, the access management server 110 generates a signed Security Assertion Markup Language (SAML) token for authorizing the ISV application 132 (or other application or service) to access the exposed APIs of the resource server 140. In the illustrative embodiment, the signed SAML token generated by the access management server 110 includes one or more entitlements corresponding to the requesting entity (e.g., the ISV or either entity) and/or the ISV application 132. The entitlements granularly define the access rights or permissions of the ISV application 132 or, more generally, the corresponding ISV (or other entity) with respect to the resource server 140 and/or the services and/or data provided thereby. In some embodiments, the embodiments included within the signed SAML token can be embodied as an access control list (ACL) that defines the permissions and/or access rights of the ISV application 132 and/or the ISV. As discussed, the SAML token generated by the access management server 110 is digitally signed. The access management server 110 can use any suitable type of hashing algorithm (e.g., SHA-256, SHA-512, etc.) and or encryption algorithm (e.g., RSA, AES, etc.) to digitally sign the generated SAML token. It should be appreciated that in embodiments in which the SAML token is encrypted and later decrypted using a public/private key pair, the public/private key pair used to encrypt and decrypt the SAML token can be different than the public/private key pair used to encrypt and decrypt the digital signature 340 of the digitally signed license token 300. Additionally, in embodiments in which the SAML token is encrypted using a private key of public/private key pair, the corresponding public key can be distributed to the resource server 140 for decrypting the SAML token. In flow 414, the access management server 110 transmits the signed SAML token to the resource server 140.

In flow 416, the resource server 140 verifies the integrity or authenticity of the received SAML token based on the digital signature appended thereto (e.g., embedded within a SAML token signature element). To do so, the resource server 140 can decrypt the digital signature of the SAML token using the public key that corresponds to the private key used by the access management server 110 to initially generate the digital signature. By decrypting the digital signature of the SAML token, the resource server 140 can, in some embodiments, obtain a previously-generated hash value of the SAML token. In such embodiments, the resource server 140 can generate a new hash value of the SAML token and verify that the newly-generated hash value matches the previously-generated hash value obtained from decrypting the digital signature of the SAML token. In flow 418, in response to verifying the integrity and authenticity of the received SAML token, the resource server 140 can locally cache the SAML token and the associated entitlements.

In flow 420, the access management server 110 forwards the service request message, initially received in flow 404, to the resource server 140. In flow 422, upon receipt of the service request message initially received and subsequently forwarded by the access management server 110, the resource server 140 authorizes the remote computing device 130, or the ISV application 132 executing thereon, to access the requested service and/or data via the exposed APIs. To do so, the resource server 140 can determine whether a SAML token including sufficient entitlements is locally cached for the ISV application 132 or, more generally, the ISV. In response to making such a determination, the ISV application 132 can be granted access to the requested service or data by the resource server 140.

In some embodiments, the access management server 110 can verify whether a SAML token, has already been generated for the requesting entity (e.g., the ISV application 132, the ISV, or another entity). To do so, the access management server 110 can determine whether the license identifier 322 embedded within the unencrypted payload portion 320 of the received digitally signed license token 300 matches a license identifier associated with a SAML token that is either locally cached in memory/storage of the access management server 110, or cached in the global access cache 160. In embodiments in which the access management server 110 determines that a matching SAML token is already cached (and therefore already generated), the access management server 110 may forward the service request message (see flow 420) to the resource server 140 for authorizing the remote computing device 130, or the ISV application 132 executing thereon, to access the requested service and/or data via the exposed APIs (see flow 422). In such embodiments, the access management server 110 does not generate a signed SAML token for transmission to the resource server 140 to be verified and locally cached (see flows 412-418).

In the illustrative embodiment described above, the access management server 110 sign/verifies the digitally signed license token 300 received from the remote computing device 130 generates a signed SAML token for transmission to the resource server 140 and, in some embodiments, performs a revocation check in other embodiments, however, the access management server 110 performs only a portion of that functionality while the remaining functionality is performed by a separate device. For example, in some embodiments, the access management server 110 can be configured to sign/verify the digitally signed license token 300 received from the remote computing device 130 while another computing device (not shown in FIG. 1) can be configured to perform any necessary revocation checks and generate the signed SAML token. In such embodiments, communications and interactions between the access management server 110 and the other computing device can take place out-of-band (e.g., using different communication sessions and/or communications channels than those used to receive the digitally signed license token 300 from the remote computing device 130, transmit the signed SAML token to the resource server 140, and/or forward the service request message to the resource server 140).

Figure 5:
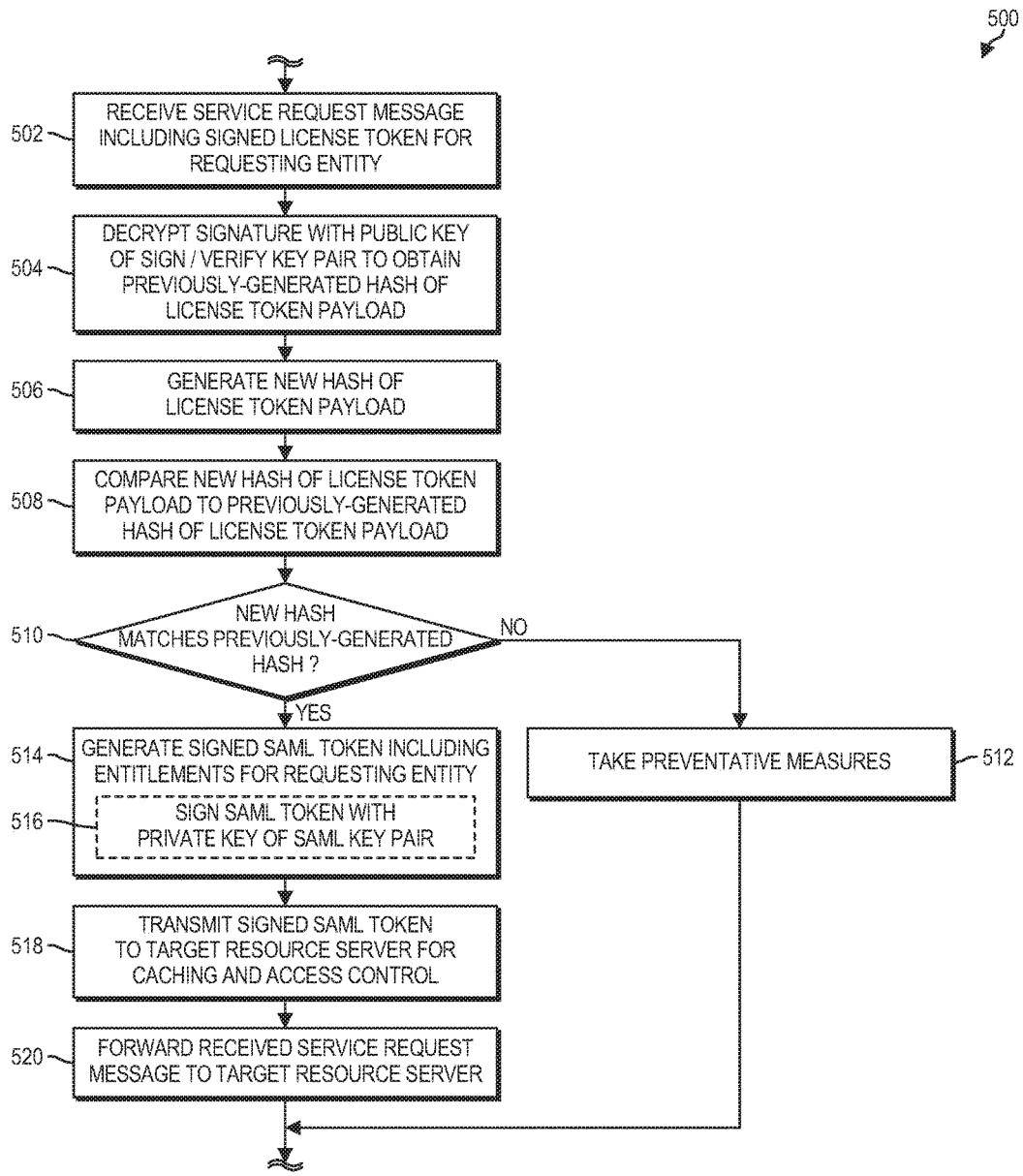
FIG. 5 is a simplified flow diagram of at least one embodiment of a method that may be executed by the access management server of FIG. 1 for authenticating a distributed computing resource as a function of a signed custom token.

Referring now to FIG. 5, a method 500 that can be executed by the access management server 110 for authenticating a distributed computing resource (e.g., the ISV application 132) of a requesting entity (e.g., an ISV or another entity) and authorizing access to a resource server 140 as a function of a digitally signed license token 300 begins with block 502. In block 502, the access management server 110 receives a service request message transmitted by the remote computing device 130, the ISV application 132, and/or intermediary computing device (e.g., the API management server 150). The service request message can be destined for the resource server 140 and can include a request to access data or services provided by the resource server 140 via one or more exposed APIs. In the illustrative embodiment, the access management server 110 receives the service request message prior to delivery/forwarding to the resource server 140. As discussed herein, the service request message includes a digitally signed license token 300 for authentication and access authorization of the ISV application 132 (or some other distributed computing resource of the requesting entity).

In block 504, the access management server 110 decrypts the digital signature 340 appended to the end of the digitally signed license token 300 included with the service request message. To do so, the access management server no identifies the public key of the public/private key pair needed to decrypt the digital signature 340 based on the sign/verify key pair identifier embedded in cleartext within the unencrypted payload portion 320 of the digitally signed license token 300. Thereafter, the access management server 110 retrieves the appropriate public key and decrypts the digital signature 340. By decrypting the digital signature 340, the access management server 110 obtains the previously-generated hash value of the unencrypted payload portion 320 of the digitally licensed token 300.

In block 506, the access management server 110 generates a new hash value of the unencrypted payload portion 320 of the digitally signed license token 300. To do so, the access management server 110 applies a hashing algorithm (e.g., SHA-256, SHA-512, etc.) to the unencrypted payload portion 320 of the received license token 300 to generate the new hash value. In some embodiments, the access management server 110 identifies the hashing algorithm to use to create the newly-generated hash value of the unencrypted payload portion 320 based on the hash algorithm type 332 embedded in cleartext within the unencrypted payload portion 320 of the digitally signed license token 300.

In block 508, the access management server 110 compares the previously-generated hash value obtained by decrypting the digital signature 310 with the new hash value generated front hashing the unencrypted payload portion 320 of the received license token 300. In decision block 510, the access management server 110 determines whether the previously-generated hash value matches the newly generated hash value. It should be appreciated that if the newly-generated hash value matches the previously-generated bash value, then the payload portion 320 of the digitally signed license token 300 was not modified prior to being received (or intercepted) by the access management server 110. If, in decision block 510, the access management server 110 determines that the newly-generated hash value of the unencrypted payload portion 320 does not match the previously-generated hash value obtained via decrypting the digital signature 340, the payload portion 320 has been tampered with and the method 500 advances to block 512.

In block 512, the access management server 110 takes preventative measures in response to determining that the newly-generated hash value of the unencrypted payload portion 320 does not match the previously-generated hash value of the unencrypted payload portion 320. For example, in some embodiments, the access management server 110 discards the service request message. Additionally or alternatively, the access management server 110 can generate and distribute one or more firewall rules to other computing devices of the system 100. Such firewall rules can be configured to cause the receiving computing device to drop or otherwise block further communications (e.g., service request messages. API calls, etc.) from the requesting entity. In other embodiments, the access management server 110 can also generate a log and/or quarantine the service request message and/or the tampered with digitally signed license token 300 for subsequent forensic investigation. It should be appreciated thru the access management server 110 can perform any other suitable type of preventative measure to protect the integrity of the system 100 and prevent malicious attacks. After performing any necessary preventative measures, the method 500 terminates.

Referring back decision block 510, if the access management server 110 determines that the newly-generated hash value of the unencrypted payload portion 320 matches the previously-generated hash value obtained via decrypting the digital signature 340, the method 500 advances to block 514. In block 514, the access management server 110 generates a signed SAML token for authorizing the ISV application 132 (or other application or service) to access the exposed APIs of the resource server 140. In the illustrative embodiment, the signed SAML token generated by the access management server 110 includes one or more entitlements corresponding to the requesting entity (e.g., the ISV or other entity) and/or the ISV application 132. The entitlements granularly define the access rights or permissions of the ISV application 132 or, more generally, the corresponding ISV (or other entity) with respect to the resource server 140 and/or the services and data provided thereby. In some embodiments, in block 516, the access management server 110 utilizes a private key of a public/private key pair to encrypt a hash of the SAML token generated as part of the signing process. In such embodiments, the public/private key pair used to encrypt and decrypt the has of the SAML token can be different than the public/private key pair used to encrypt and decrypt the digital signature 340 of the license token 300. In block 518, the access management server 110 transmits the signed SAML token to the target resource server 140 for local caching and performance of access control operations. In some embodiments, instead of transmitting the signed SAML token to the target resource server 140 for local caching, the access management server 110 transmits the signed SAML token to the global access cache 160 to be verified and cached. In such embodiments, the target resource server 140 (and any other resource servers 140 of the system 100) can be configured to communicate with the global access cache 160 to determine, based on the globally-cached SAML tokens, whether the ISV application 132 should be authorized to access the requested, resources and/or services.

In block 520, the access management server 110 forwards the service request message initially received in block 502 to the target resource server 140. As discussed herein, the target resource server 140 can utilize locally-cached or globally-cached SAML tokens and corresponding entitlements to determine whether to authorize the ISV application 132 to access the requested services or data exposed via the one or more APIs.

Figure 6:
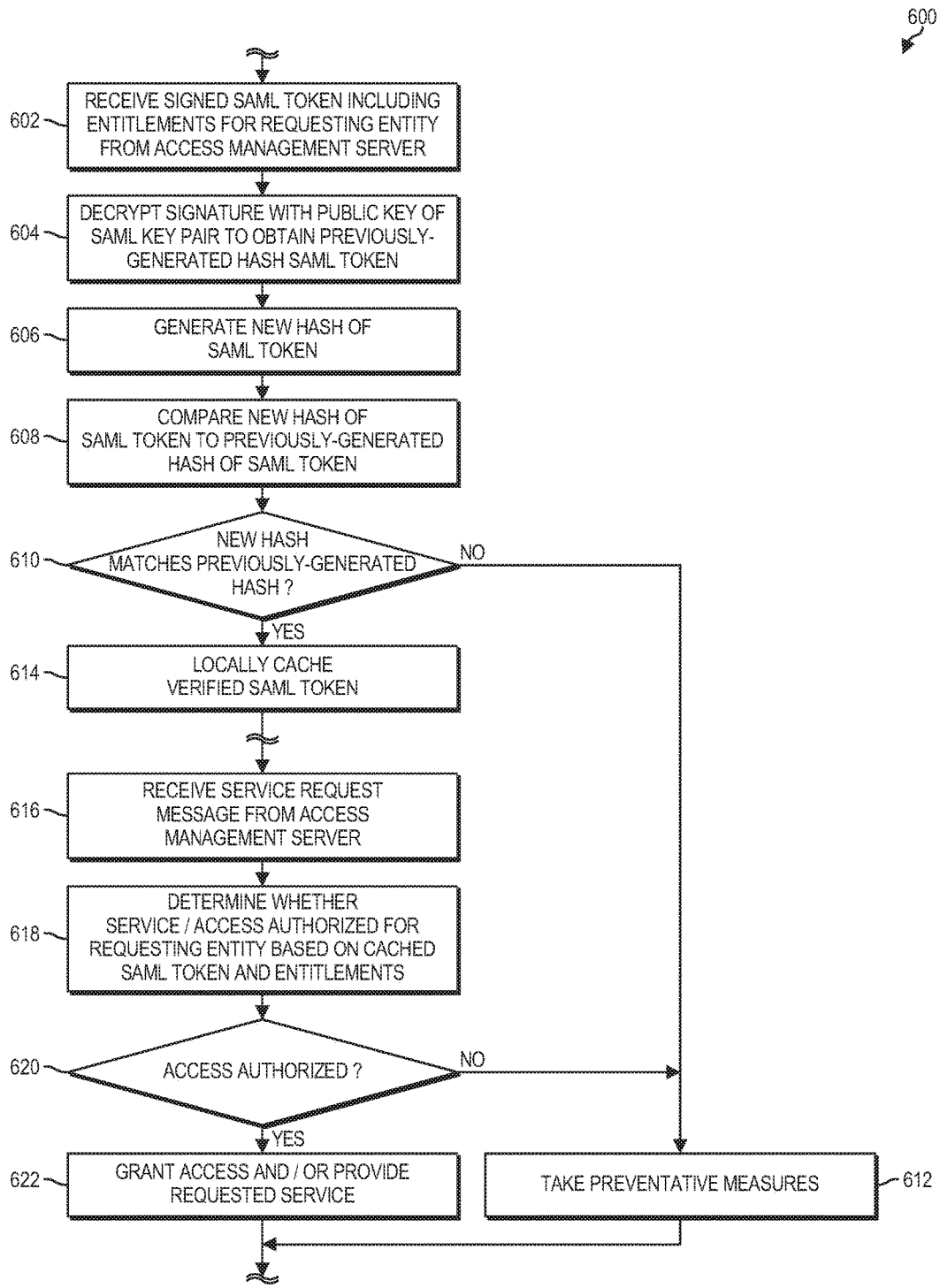
FIG. 6 is a simplified flow diagram of at least one embodiment of a method that may be executed by the resource server of FIG. 1 for authenticating a distributed computing resource to access services or data of the resource server.

Referring now to FIG. 6, a method 600 that can be executed by the resource server 140 for authenticating a distributed computing resource (e.g., the ISV application 132) of a requesting entity (e.g., an ISV or another entity) to access resources or services of the resource server 140 begins with block 602. In block 602, the resource server 140 receives a signed SAML token from the access management server 110. The signed SAML token received from the access management server 110 includes one or more entitlements corresponding to the requesting entity (e.g., the ISV or other entity) and/or the ISV application 132. The entitlements granularly define the access rights or permissions of the ISV application 132 or, more generally, the corresponding ISV (or other entity) with respect to the resource server 140 and/or the services and/or data provided thereby.

In block 604, the resource server 140 decrypts the digital signature appended to the received SAML token. To do so, the resource server 140 can decrypt the digital signature of the SAML token using the public key that corresponds to the private key used by the access management server 110 to initially generate the digital signature. It should be appreciated that by decrypting the digital signature of the SAML token, the resource server 140 can, in some embodiments, obtain a previously-generated hash value of the SAML token.

In block 606, the resource server 140 generates a new hash value of the received SAML token. To do so, the resource server 140 applies a hashing algorithm (e.g., SHA-256, SHA-512, etc.) to the received SAML token to generate the new hash value in the illustrative embodiment, the resource server 140 utilizes the same hashing algorithm to generate the new hash value of the SAML token as the hashing algorithm used by the access management server 110 during initial generation of the digital signature for the SAML token.

In block 608, the resource server 140 compares the previously-generated hash value obtained by decrypting the digital signature of the SAML token with the new hash value generated from hashing the SAML token received from the access management server 110. In decision block 610, the resource sever 140 determines whether the previously-generated hash value matches the newly generated hash value. It should be appreciated that if the newly-generated hash value matches the previously-generated hash value, then the SAML token was not modified prior to being received by the resource server 140. If, in decision block 610, the resource server 140 determines that the newly-generated hash value of SAML token does not match the previously-generated hash value obtained via decrypting the digital signature, the SAML token has been tampered with and the method 600 advances to block 612.

In block 612, the resource server 140 takes preventative measures in response to determining that the newly-generated hash value of the received SAML token does not match the previously-generated hash value of the SAML token obtained via decrypting the digital signature appended thereto. For example, in some embodiments, the resource server 140 discards the received SAML token. Additionally or alternatively, the resource server 140 can generate and distribute one or more firewall rules to other computing devices of the system 100. In other embodiments, the resource server 140 can also generate a log and/or quarantine the received SAML token for subsequent forensic investigation. It should be appreciated that the resource server 140 can perform any other suitable type of preventative measure to protect the integrity of the system 100 and prevent malicious attacks. After performing any necessary preventative measures, the method 600 terminates.

Referring back to decision block 610, if the resource server 140 determines that the newly-generated has value of the received SAML token matches the previously-generated hash value obtained via decrypting the digital signature appended to the received SAML token, the method 600 advances to block 614. In block 614, the resource server 140 locally caches the received SAML token and the included entitlements.

In block 610, the resource server 140 receives the service request message initially received by the access management server 110. The service request message can include a request by the ISV application 132 to access data or services provided by the resource server 140 via one or more exposed APIs. In some embodiments, the service request message initially received and later forwarded by the access management server 110 includes, a digitally signed license token 300, which as described herein, can be used to facilitate authenticating the ISV application 132 by the access management server 110 and authorizing the ISV application 132 to access requested services and data provided by the resource server 140.

In block 618, the resource server 140 determines whether the ISV application 132 is authorized to access the requested services and/or data provided by the resource serer 140. To do so, the resource server 140 can determine whether a SAML token including sufficient entitlements is locally cached for the ISV application 132, or more generally, the ISV. In some embodiments, the resource server 140 can make such determination based at least in part on, or otherwise as a function of, the license identifier 322 embedded within the encrypted payload 320 portion of the digitally signed license token 300 and license identifiers associated with each of the locally cached SAML tokens. In response to making such a determination, the resource server 130 can determine that the ISV application 132 should be authorized to access the requested services and/or data. In decision block 620, the resource server 140 determines whether access to the requested services and/or data is authorized for the ISV application 132. If, in decision block 620, the resource server 140 determines that the ISV application 132 should not be authorized to access the requested services and/or data of the resource server 140, the method 600 advances to block 612 in which the resource server 140 takes preventative measures and the method 600 subsequently terminates. If, however, the resource server 140 determines instead that the ISV application 132 should be authorized to access the requested services and/or data of the resource server 140, the method 600 advances to block 622. In block 622, the resource server 140 grants access to the requested services and/or data provided by the resource server 140 via the exposed APIs.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed herein should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods can be described solely in connection with a specific figure. In this disclosure, any identification of special techniques, arrangements, etc. are either related to a specific example presented or are merely a general description of such a technique, arrangement, etc. Identification of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and can be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead can be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics can be combined in any suitable manner in one or some embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part, of a specific component or module, or as occurring at a specific layer of a computing device (for example, a hardware layer, operating system layer, or application layer), those features or functions can be implemented as part of a different component or module or operated at a different layer of a communication protocol stack. Those of ordinary skill in the an will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combinations thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A method for token-based access authorization to an application program interface (API), the method comprising:

receiving, from a remote computing device, a request message requesting access to an API of a server, the request message including a digitally signed license token comprising an unencrypted payload portion and a digital signature comprising a previously-generated hash value of the unencrypted payload portion encrypted with a private key of a cryptographic key pair;

decrypting the digital signature with a corresponding public key of the cryptographic key pair to obtain the previously-generated hash value;

generating a new hash value of the unencrypted payload portion;

determining whether the new hash value matches the previously-generated hash value;

upon determining that the new hash value matches the previously-generated hash value, generating a new digitally signed token, the new digitally signed token including one or more entitlements defining access rights of the remote computing device to access the API of the server;

transmitting the new digitally signed token to the server; and forwarding the request message to the server.

2. The method of claim 1, further comprising generating the digitally signed license token prior to receiving the request message from the remote computing device.

3. The method of claim 1, wherein the unencrypted payload portion comprises a license identifier to uniquely identify the digitally signed license token, a unique key corresponding to an entity associated with the remote computing device, an expiration date to indicate a date on which the digitally signed license token expires, a key pair identifier to identify the cryptographic key pair, a hash algorithm type to identify a hash algorithm used to generate the digital signature, an encryption algorithm type to identify an encryption algorithm used to generate the digital signature, and a token format version to indicate a version of the digitally signed license token.

4. The method of claim 3, wherein the unique key is embedded as an extended attribute within the unencrypted payload portion.

5. The method of claim 3, further comprising generating the digitally signed license token prior to receiving the request message from the remote computing device, wherein generating the digitally signed license token comprises:

generating the license identifier to uniquely identify the digitally signed license token;

identifying the unique key corresponding to the entity associated with the remote computing device;

determining the expiration date for the digitally signed license token;

embedding the license identifier, unique key, expiration date, the key pair identifier, the hash algorithm type, the encryption algorithm type, and the token format version into the unencrypted payload portion in cleartext; and generating the digital signature appended to the digitally signed license token.

6. The method of claim 5, wherein generating the digital signature appended to the digitally signed license token comprises:

hashing the unencrypted payload portion with a hashing algorithm to generate the previously-generated hash value, wherein the hashing algorithm corresponds to the hash algorithm type; and encrypting the previously-generated hash value with the private key of the cryptographic key pair as a function of an encryption algorithm corresponding to the encryption algorithm type.

7. The method of claim 1, wherein receiving the request message from the remote computing device comprises receiving a forwarded request message from an API management server or from an application of an Independent Software Vendor (ISV) executing on the remote computing device.

8. An access management server for token-based access authorization to an application program interface (API), the access management server comprising logic stored in memory, which when executed by a processor of the access management server, causes the access management server to:

receive, from a remote computing device, a request message requesting access to an API of a server, the request message including a digitally signed license token comprising an unencrypted payload portion and a digital signature comprising a previously-generated hash value of the unencrypted payload portion encrypted with a private key of a cryptographic key pair;

decrypt the digital signature with a corresponding public key of the cryptographic key pair to obtain the previously-generated hash value;

generate a new hash value of the unencrypted payload portion;

determine whether the new hash value matches the previously-generated hash value;

upon determining that the new hash value matches the previously-generated hash value, generate a new digitally signed token, the new digitally signed token including one or more entitlements defining access rights of the remote computing device to access the API of the server;

transmit the new digitally signed token to the server; and forward the request message to the server.

9. The access management server of claim 8, wherein the logic further causes the access management server to generate the digitally signed license token prior to receipt of the request message from the remote computing device.

10. The access management server of claim 8, wherein the unencrypted payload portion comprises a license identifier to uniquely identify the digitally signed license token, an unique key corresponding to an entity associated with the remote computing device, an expiration date to indicate a date on which the digitally signed license token expires, a key pair identifier to identify the cryptographic key pair, a hash algorithm type to identify a hash algorithm used to generate the digital signature, an encryption algorithm type to identify an encryption algorithm used to generate the digital signature, and a token format version to indicate a version of the digitally signed license token.

11. The access management server of claim 10, wherein the unique key is embedded as an extended attribute within the unencrypted payload portion.

12. The access management server of claim 10, wherein the logic further causes the access management to generate the digitally signed license token prior to receipt of the request message from the remote computing device, wherein generating the digitally signed license token comprises:

generate the license identifier to uniquely identify the digitally signed license token;

identify the unique key corresponding to the entity associated with the remote computing device;

determine the expiration date for the digitally signed license token;

embed the license identifier, unique key, expiration date, the key pair identifier, the hash algorithm type, the encryption algorithm type, and the token format version into the unencrypted payload portion in cleartext; and generate the digital signature appended to the digitally signed license token.

13. The access management server of claim 12, wherein generating the digital signature appended to the digitally signed license token comprises:

hash the unencrypted payload portion with a hashing algorithm to generate the previously-generated hash value, wherein the hashing algorithm corresponds to the hash algorithm type; and encrypt the previously-generated hash value with the private key of the cryptographic key pair as a function of an encryption algorithm corresponding to the encryption algorithm type.

14. The access management server of claim 8, wherein receiving the request message from the remote computing device comprises receiving a forwarded request message from an API management server or receiving the request message from an application of an Independent Software Vendor (ISV) executed on the remote computing device.

15. A system for token-based authentication and access authorization to an application program interface (API), the system comprising:

a remote computing device;

an access management server; and a server;

wherein the access management server is configured to:
receive, from the remote computing device, a request message requesting access to an API of the server, the request message including a digitally signed license token comprising an unencrypted payload portion and a first digital signature comprising a previously-generated hash value of the unencrypted payload portion encrypted with a private key of a cryptographic key pair;

decrypt the first digital signature with a corresponding public key of the cryptographic key pair to obtain the previously-generated hash value;

generate a new hash value of the unencrypted payload portion;

determine whether the new hash value matches the previously-generated hash value;

upon determining that the new hash value matches the previously-generated hash value, generate a new digitally signed token, the new digitally signed token including one or more entitlements defining access rights of the remote computing device to access the API of the server and a second digital signature appended thereto;

transmit the new digitally signed token to the server; and forward the request message to the server; and wherein the server is configured to:

receive the new digitally signed token from the access management server;

verify the second digital signature appended to the new digitally signed token;

upon verifying the second digital signature, locally cache the new digitally signed token and associated entitlements;

receive the request message forwarded by the access management server;

determine, as a function of the locally-cached new digitally signed token and associated entitlements, whether the access to the API requested by the remote computing device is authorized; and upon determining that access to the API is authorized, grant the remote computing device access to the API.

16. The system of claim 15, wherein the access management server is further configured to generate the digitally signed license token prior to receipt of the request message from the remote computing device.

17. The system of claim 15, wherein the unencrypted payload portion of the digitally signed license token comprises a license identifier to uniquely identify the digitally signed license token, a unique key corresponding to an entity associated with the remote computing device, an expiration date to indicate a date on which the digitally signed license token expires, a key pair identifier to identify the cryptographic key pair, a hash algorithm type to identify a hash algorithm used to generate the first digital signature, an encryption algorithm type to identify an encryption algorithm used to generate the first digital signature, and a token format version to indicate a version of the digitally signed license token.

18. The system of claim 17, wherein the unique key is embedded as an extended attribute within the unencrypted payload portion.

19. The system of claim 17, wherein the access management server is further configured to generate the digitally signed license token prior to receipt of the request message from the remote computing device, wherein generating the digitally signed license token comprises:

generate the license identifier to uniquely identify the digitally signed license token;

identify the unique key corresponding to the entity associated with the remote computing device;

determine the expiration date for the digitally signed license token;

embed the license identifier, unique key, expiration date, the key pair identifier, the hash algorithm type, the encryption algorithm type, and the token format version into the unencrypted payload portion in cleartext; and generate the first digital signature appended to the digitally signed license token.

20. The system of claim 19, wherein generating the first digital signature appended to the digitally signed license token comprises:

hash the unencrypted payload portion with a hashing algorithm to generate the previously-generated hash value, wherein the hashing algorithm corresponds to the hash algorithm type; and encrypt the previously-generated hash value with the private key of the cryptographic key pair as a function of an encryption algorithm corresponding to the encryption algorithm type.

* * * * *